United States Patent
Peng et al.

(10) Patent No.: US 10,508,480 B2
(45) Date of Patent: Dec. 17, 2019

(54) METHOD AND SYSTEM FOR UNLOCKING VEHICLE ENGINE COVER

(71) Applicants: Saic General Motors Corporation Limited, Shanghai (CN); Pan Asia Technical Automotive Center Company Limited, Shanghai (CN)

(72) Inventors: Junqiao Peng, Shanghai (CN); Mu Qian, Shanghai (CN); Yan Hao, Shanghai (CN); Tao Li, Shanghai (CN); Zhankui He, Shanghai (CN); Qiang Zhou, Shanghai (CN)

(73) Assignees: Saic General Motors Corporation Limited (CN); Pan Asia Technical Automotive Center Company Limited (CN)

( * ) Notice: Subject to any disclaimer, the term of this patent is extended or adjusted under 35 U.S.C. 154(b) by 30 days.

(21) Appl. No.: 15/571,726

(22) PCT Filed: May 4, 2016

(86) PCT No.: PCT/CN2016/080979
§ 371 (c)(1),
(2) Date: Nov. 3, 2017

(87) PCT Pub. No.: WO2016/177325
PCT Pub. Date: Nov. 10, 2016

(65) Prior Publication Data
US 2018/0155967 A1    Jun. 7, 2018

(30) Foreign Application Priority Data
May 4, 2015    (CN) .......................... 2015 1 0225379

(51) Int. Cl.
*E05B 83/24*    (2014.01)
*E05B 81/64*    (2014.01)
(Continued)

(52) U.S. Cl.
CPC .............. *E05B 83/24* (2013.01); *E05B 81/64* (2013.01); *E05B 81/66* (2013.01); *G06F 3/017* (2013.01)

(58) Field of Classification Search
CPC .......... E05B 83/24; E05B 81/64; E05B 81/76; E05B 81/77; E05B 81/78
See application file for complete search history.

(56) References Cited

U.S. PATENT DOCUMENTS 4,556,588 A * 12/1985 Rockwood .............. B44C 5/005
428/13
2002/0033294 A1    3/2002 Ishizaki et al.
(Continued)

FOREIGN PATENT DOCUMENTS

CN    102806946 A    12/2012
CN    202937083 U    5/2013
(Continued)

OTHER PUBLICATIONS

International Search Report for Application No. PCT/CN2016/080979 dated Aug. 10, 2016.

*Primary Examiner* — Aaron L Troost
(74) *Attorney, Agent, or Firm* — Lerner, David, Littenberg, Krumholz & Mentlik, LLP

(57) ABSTRACT

The present invention discloses a method and system for unlocking vehicle engine cover. Method comprising: acquiring an action signal transmitted from an action sensor, and executing an action signal judging step; executing an unlocking step if the received action signal matches a preset unlock action signal, otherwise not executing the unlocking step, the unlock action signal is a combination of a signal or a plurality of consecutive signals; unlocking step: sending an unlock signal to an engine cover lock, wherein the unlock signal is used to control the engine cover lock to perform an unlock operation on a vehicle engine cover. The present (Continued)

invention detects an action signal from an action sensor, and controls whether or not to unlock the vehicle engine cover by matching the action signal with a preset unlock action signal. So users do not need to enter into the passenger compartment for unlocking. The operation is both convenient and rich sense of technology.

18 Claims, 14 Drawing Sheets

(51) Int. Cl.
    *E05B 81/66*     (2014.01)
    *G06F 3/01*     (2006.01)

(56) References Cited

U.S. PATENT DOCUMENTS

| | | | |
|---|---|---|---|
| 2003/0216817 A1* | 11/2003 | Pudney | E05B 81/78 |
| | | | 700/17 |
| 2005/0284678 A1 | 12/2005 | Muia-Longman | |
| 2012/0249291 A1* | 10/2012 | Holcomb | G07C 9/00563 |
| | | | 340/5.51 |
| 2015/0336521 A1* | 11/2015 | Tofilescu | B60R 16/023 |
| | | | 382/104 |

FOREIGN PATENT DOCUMENTS

| | | |
|---|---|---|
| CN | 203465769 U | 3/2014 |
| CN | 204436087 U | 7/2015 |

* cited by examiner

METHOD AND SYSTEM FOR UNLOCKING VEHICLE ENGINE COVER

CROSS REFERENCE TO RELATED APPLICATIONS

The present application is a national phase entry under 35 U.S.C. § 371 of International Application No. PCT/CN2016/080979, filed May 4, 2016, which claims priority from Chinese Patent Application No. 201510225379.0 filed May 4, 2015, all of which are hereby incorporated herein by reference.

TECHNICAL FIELD

The present application relates to a method and system for unlocking vehicle engine cover.

BACKGROUND ART

At present, a manual opening handle is arranged in the passenger compartment to be used to open the vehicle engine cover. When the user needs to open the engine cover, the user firstly enters into the passenger compartment to find the opening handle, and then manually pulls the opening handle. The engine cover is unlocked through the action of a cable to realize the opening of the engine cover.

In the prior art the user is required to firstly enter into the passenger compartment to pull the handle in order to unlock the engine cover, thus the operation is too complicated.

SUMMARY

Accordingly, it is necessary to provide a method and system for unlocking vehicle engine cover for solving the technical problems that the existing opening manner of engine cover is too complicated.

One aspect of the present invention provides a method for unlocking vehicle engine cover, comprising:

action triggering step: acquiring an action signal transmitted from an action sensor, and executing an action signal judging step;

action signal judging step: executing an unlocking step if the received action signal matches a preset unlock action signal, and not executing the unlocking step if the received action signal does not match the preset unlock action signal;

unlocking step: sending an unlock signal to an engine cover lock, wherein the unlock signal is used to control the engine cover lock to perform an unlock operation on a vehicle engine cover.

Preferably, the action sensor is a gesture action sensor for detecting a user gesture, and the action signal is a gesture action signal.

Conveniently, the gesture action sensor is a camera device or an infrared detection device.

Conveniently, the camera device is provided on a front region of top of the vehicle, an inner rearview mirror area, an edge region of front windshield, a dashboard, an outer rearview mirror, or an A column of the vehicle, and the shooting direction of the camera device is towards the direction of the front of the vehicle.

Conveniently, an effective detection area of the infrared detection device is a region extending the preset distance from a vehicle outer contour of the vehicle head.

Preferably, the action sensor is a contact action sensor for detecting a user's action on the engine cover, and the action signal is a contact action signal.

Conveniently, the contact action sensor is a pressing sensor or an angle sensor.

Conveniently, the pressing sensor is provided within a range surrounded by a front bumper, a front headlamp and a front beam of the vehicle, on the front bumper, on the front headlamp, or on the front beam.

Preferably, the engine cover lock includes a lock body, a release mechanism and a rotation mechanism, the lock body is in connection with the vehicle engine cover, the rotation mechanism is rotatable around a rotation shaft fixed to the lock body to cooperate with the release mechanism to form a locked state or an unlocked state, the rotation mechanism rotates to the lock occurrence direction in locked state to trigger the contact action sensor to transmit the action signal.

Conveniently, the rotation mechanism includes a latch, the release mechanism includes a notch fitted to the latch, the latch is engaged with the notch to form the locked state or the unlocked state when the rotation mechanism is rotating, the latch is provided with a first projection, the contact action sensor is a first pressing sensor, when the rotation mechanism rotates to the lock occurrence direction in locked state to cause the first projection presses the first pressing sensor, the first pressing sensor is triggered to output the action signal.

Preferably, the action triggering step specifically includes: reading a gear position information and an output signal of the locked state sensor for monitoring the switching state of the vehicle engine cover in response to a received vehicle unlock signal, executing the unlocking step if the gear position information is parked gear position and the output signal of the locked state sensor is a closed signal identifying the vehicle engine cover as a closed state, and not executing the unlocking step if the gear position information is un-parked gear position or the output signal of the locked state sensor is a opened signal identifying the vehicle engine cover as a opened state.

Conveniently, the engine cover lock includes a lock body, a release mechanism and a rotation mechanism, the lock body is in connection with the vehicle engine cover, the rotation mechanism is rotatable around a rotation shaft fixed to the lock body to cooperate with the release mechanism to form a locked state or an unlocked state, the locked state sensor is triggered to output the closed signal identifying the vehicle engine cover as the closed state when the rotation mechanism is in locked state, the locked state sensor is triggered to output the opened signal identifying the vehicle engine cover as the opened state when the rotation mechanism is in unlocked state.

Conveniently, the rotation mechanism includes a latch, the release mechanism includes a notch fitted to the latch, the latch is engaged with the notch to form the locked state or the unlocked state when the rotation mechanism is rotating, the latch is provided with a second projection, the lock state sensor is a second pressing sensor, the second projection is continuously pressing the second pressing sensor when the rotation mechanism is in the locked state so that the second pressing sensor outputs the closed signal identifying the vehicle engine cover as the closed state, the second projection is separated from the second pressing sensor when the rotation mechanism is in the unlocked state so that the second pressing sensor outputs the opened signal identifying the vehicle engine cover as the opened state.

Conveniently, the unlock action signal is a combination of a signal or a plurality of consecutive signals.

Another aspect of the present invention provides a system for unlocking vehicle engine cover, comprising:

action triggering module, used for acquiring an action signal transmitted from an action sensor, and executing an action signal judging module;

action signal judging module, used for executing an unlocking module if the received action signal matches a preset unlock action signal, and not executing the unlocking module if the received action signal does not match the preset unlock action signal;

unlocking module, used for sending an unlock signal to an engine cover lock, wherein the unlock signal is used to control the engine cover lock to perform an unlock operation on a vehicle engine cover.

Preferably, the action sensor is a gesture action sensor for detecting a user gesture, and the action signal is a gesture action signal.

Conveniently, the gesture action sensor is a camera device or an infrared detection device.

Conveniently, the camera device is provided on a front region of top of the vehicle, an inner rearview mirror area, an edge region of front windshield, a dashboard, an outer rearview mirror, or an A column of the vehicle, and the shooting direction of the camera device is towards the direction of the front of the vehicle.

Conveniently, an effective detection area of the infrared detection device is a region extending the preset distance from a vehicle outer contour of the vehicle head.

Preferably, wherein the action sensor is a contact action sensor for detecting a user's action on the engine cover, and the action signal is a contact action signal.

Conveniently, the contact action sensor is a pressing sensor or an angle sensor.

Conveniently, the pressing sensor is provided within a range surrounded by a front bumper, a front headlamp and a front beam of the vehicle, on the front bumper, on the front headlamp, or on the front beam.

Conveniently, the engine cover lock includes a lock body, a release mechanism and a rotation mechanism, the lock body is in connection with the vehicle engine cover, the rotation mechanism is rotatable around a rotation shaft fixed to the lock body to cooperate with the release mechanism to form a locked state or an unlocked state, the rotation mechanism rotates to the lock occurrence direction in locked state to trigger the contact action sensor to transmit the action signal.

Conveniently, the rotation mechanism includes a latch, the release mechanism includes a notch fitted to the latch, the latch is engaged with the notch to form the locked state or the unlocked state when the rotation mechanism is rotating, the latch is provided with a first projection, the contact action sensor is a first pressing sensor, when the rotation mechanism rotates to the lock occurrence direction in locked state to cause the first projection presses the first pressing sensor, the first pressing sensor is triggered to output the action signal.

Conveniently, the action triggering module specifically includes:

reading a gear position information and an output signal of the locked state sensor for monitoring the switching state of the vehicle engine cover in response to a received vehicle unlock signal, executing the unlocking module if the gear position information is parked gear position and the output signal of the locked state sensor is a closed signal identifying the vehicle engine cover as a closed state, and not executing the unlocking module if the gear position information is un-parked gear position or the output signal of the locked state sensor is a opened signal identifying the vehicle engine cover as a opened state.

Conveniently, the engine cover lock includes a lock body, a release mechanism and a rotation mechanism, the lock body is in connection with the vehicle engine cover, the rotation mechanism is rotatable around a rotation shaft fixed to the lock body to cooperate with the release mechanism to form a locked state or an unlocked state, the locked state sensor is triggered to output the closed signal identifying the vehicle engine cover as the closed state when the rotation mechanism is in locked state, the locked state sensor is triggered to output the opened signal identifying the vehicle engine cover as the opened state when the rotation mechanism is in unlocked state.

Conveniently, the rotation mechanism includes a latch, the release mechanism includes a notch fitted to the latch, the latch is engaged with the notch to form the locked state or the unlocked state when the rotation mechanism is rotating, the latch is provided with a second projection, the lock state sensor is a second pressing sensor, the second projection is continuously pressing the second pressing sensor when the rotation mechanism is in the locked state so that the second pressing sensor outputs the closed signal identifying the vehicle engine cover as the closed state, the second projection is separated from the second pressing sensor when the rotation mechanism is in the unlocked state so that the second pressing sensor outputs the opened signal identifying the vehicle engine cover as the opened state.

Conveniently, the unlock action signal is a combination of a signal or a plurality of consecutive signals.

The present invention detects an action signal generated by a user action from an action sensor, and controls whether or not to unlock the vehicle engine cover by matching the action signal with a preset unlock action signal. So users do not need to enter into the passenger compartment for unlocking. Users can operate outside the car to trigger the engine cover to unlock. The operation is both convenient and rich sense of technology.

DETAILED DESCRIPTION OF THE EMBODIMENTS

Hereinafter, the present invention is further introduced in detail by the particular embodiments in combination with the figures.

Figure 1:
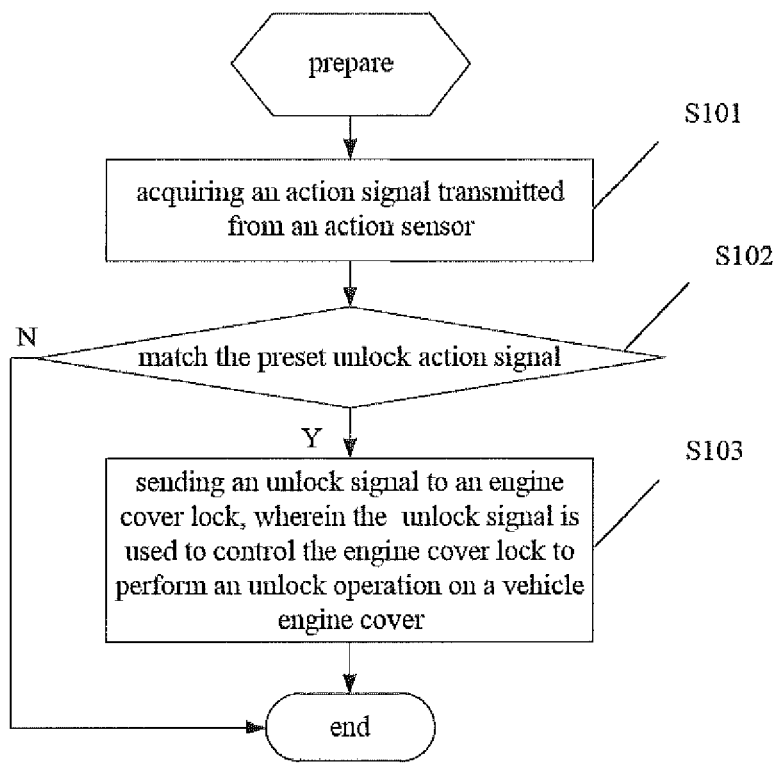
FIG. 1 shows a flow-process diagram illustrating a method for unlocking vehicle engine cover in accordance with the present invention.

FIG. 1 show a flow-process diagram illustrating a method for unlocking vehicle engine cover, comprising:

step S101: acquiring an action signal transmitted from an action sensor, and executing step S102;

step S102: executing step S103 if the received action signal matches a preset unlock action signal, otherwise not executing the step S103;

Wherein the preset unlock action signal is an action signal set in advance by the user, and when the action signal transmitted by the action sensor matches the preset unlock action signal, it is considered that the user has executed a predetermined action.

step S103: sending an unlock signal to an engine cover lock, wherein the unlock signal is used to control the engine cover lock to perform an unlock operation on a vehicle engine cover.

The action sensor is used to detect the action of the user to the vehicle, in step S101 the action signal transmitted from the action sensor is acquired, and in the step S102 it is to test whether the action signal is matched with the preset unlock action signal.

The unlock signal is sent to the engine cover lock in step S103 so that the engine cover lock performs an unlock operation.

The engine cover is also known as the front cover. The engine cover lock can include an actuator that controls the unlocking. The unlock signal can be either a high level voltage or a low level voltage sent to the actuator, and the actuator performs an unlock operation after receiving the unlock signal. When the action signal received in step S102 does not match the preset unlock action signal, step S103 is not executed, step S101 may be continued, the action signal may be continuously acquired, or the step may be ended. Preferably, step S101 is executed when the action signal received in step S102 does not match the preset unlock action signal.

Since the action sensor is used to detect the action of the user to the vehicle, compared to the prior art in which the user needs to enter the passenger compartment to unlock the engine cover, the user of the present invention only needs to perform action before the engine cover when unlocking the engine cove, no needs to enter the passenger compartment to unlock, the operation is convenient, as well as brings sense of technology.

In one of the embodiments, the action sensor is a gesture action sensor for detecting a user gesture, and the action signal is a gesture action signal.

The gesture action sensor detects the user's gesture and converts the user gesture into an action signal. When the generated action signal matches the preset unlock action signal, step S103 will be performed and the engine cover is unlocked in step S103. The user can record the unlock gesture in advance by the gesture action sensor, convert it to the corresponding unlock action signal by the gesture action sensor, and save the corresponding unlock action signal.

The unlock action signal can be a signal which is converted from one or more waving gestures. When the user performs one waving gesture or multiple waving gestures, the corresponding gesture action sensor captures the waving gesture and converts it into an action signal and compares the action signal with the unlock action signal. When the two are match, step S103 is triggered to unlock the engine cover.

In one of the embodiments, the gesture action sensor is a camera device or an infrared detection device.

The camera device converts the user's gestures into the corresponding gesture action signals by recording the user's gestures and executing gesture analysis to determine the gesture feature. For example, gestures ID are used as gesture action signals. The different gestures are identified by a unique number. The user sets an unlock gesture in advance, such as clenching one's fist, one finger swing, two fingers swinging, etc., and save the gesture ID of the unlock gesture as an unlock action signal. When the user performs a gesture before the camera device, the camera device captures the video, separates the hand picture from the video, and analyses the picture to obtain the user gesture and the corresponding gesture ID. The gesture ID corresponding to the acquired user gesture is compared with the gesture ID corresponding to the unlock action signal, if they matched, step S103 will be triggered to unlock the engine cover.

The infrared detection device detects the user's gesture by infrared light and converts the user's gesture into the corresponding gesture action signal. For example, setting the signals that the number of waving times is greater than the preset number of times threshold and the waving time gap is smaller than the preset time gap threshold as the gesture action signal. For example, the user can set the signal that waving gesture is made more than twice and waving time gap is less than 1 second as the unlock action signal. When the user waves before the infrared detection device, the infrared detection device judges and confirms that the infrared light was blocked, and the number of waving and the waving time gap were judged according to the parameters such as the blocking time and the number of blocks. The number of waving and the waving time gap corresponding to the acquired user gesture are compared with the number of waving and the waving time gap corresponding to the unlock action signal, if they match, step S103 will be triggered to unlock the engine cover.

In one of the embodiments, the camera device is provided on a front region 81 of top of the vehicle, an inner rearview mirror area 82, an edge region 83 of front windshield, a dashboard 84, an outer rearview mirror 85, or an A column 86 of the vehicle, and the shooting direction of the camera device is towards the direction of the front of the vehicle.

Figure 8:
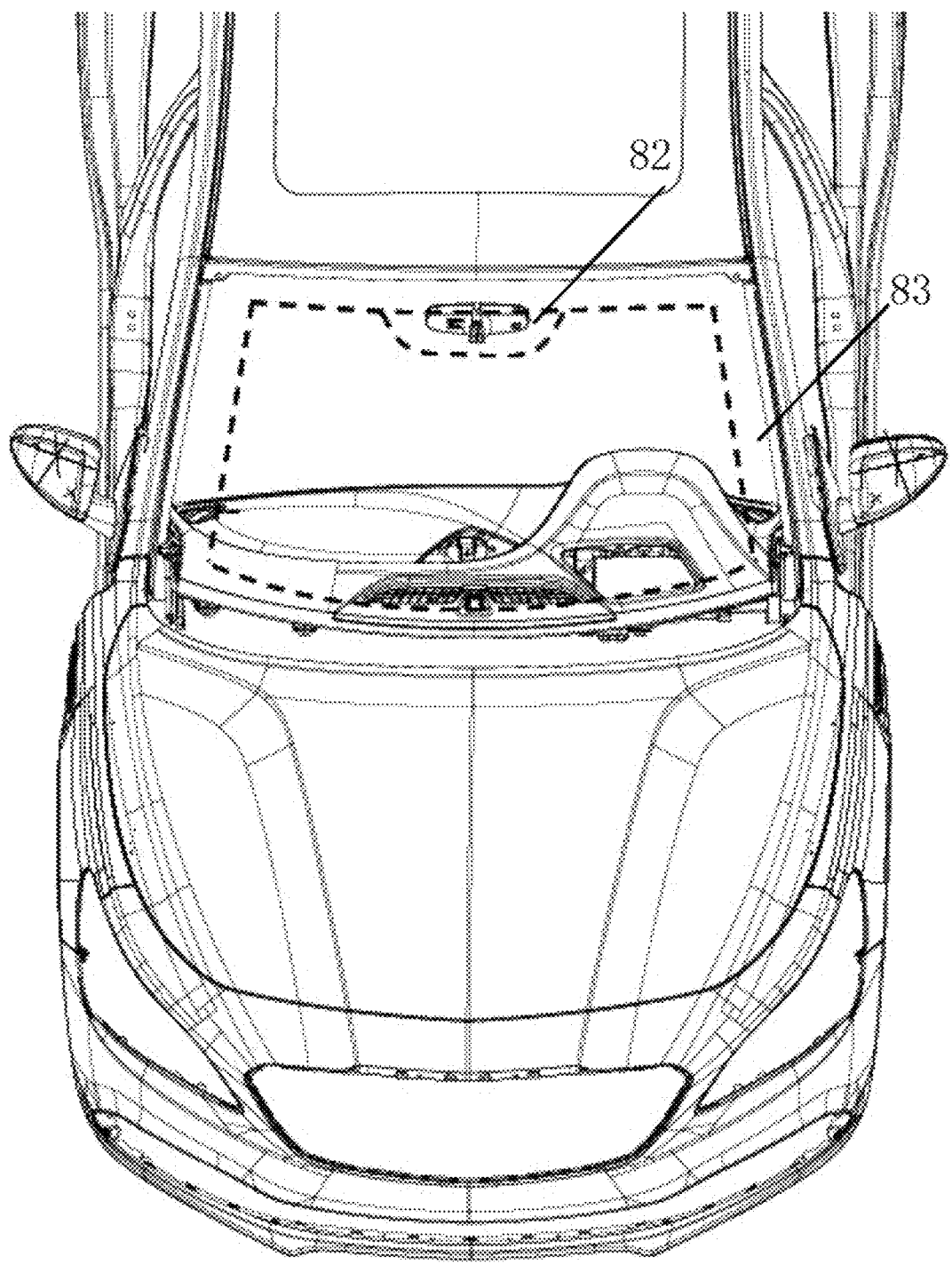
FIG. 8 shows a schematic view of the setting range of the camera device in accordance with one embodiment of the present invention.
Figure 9:
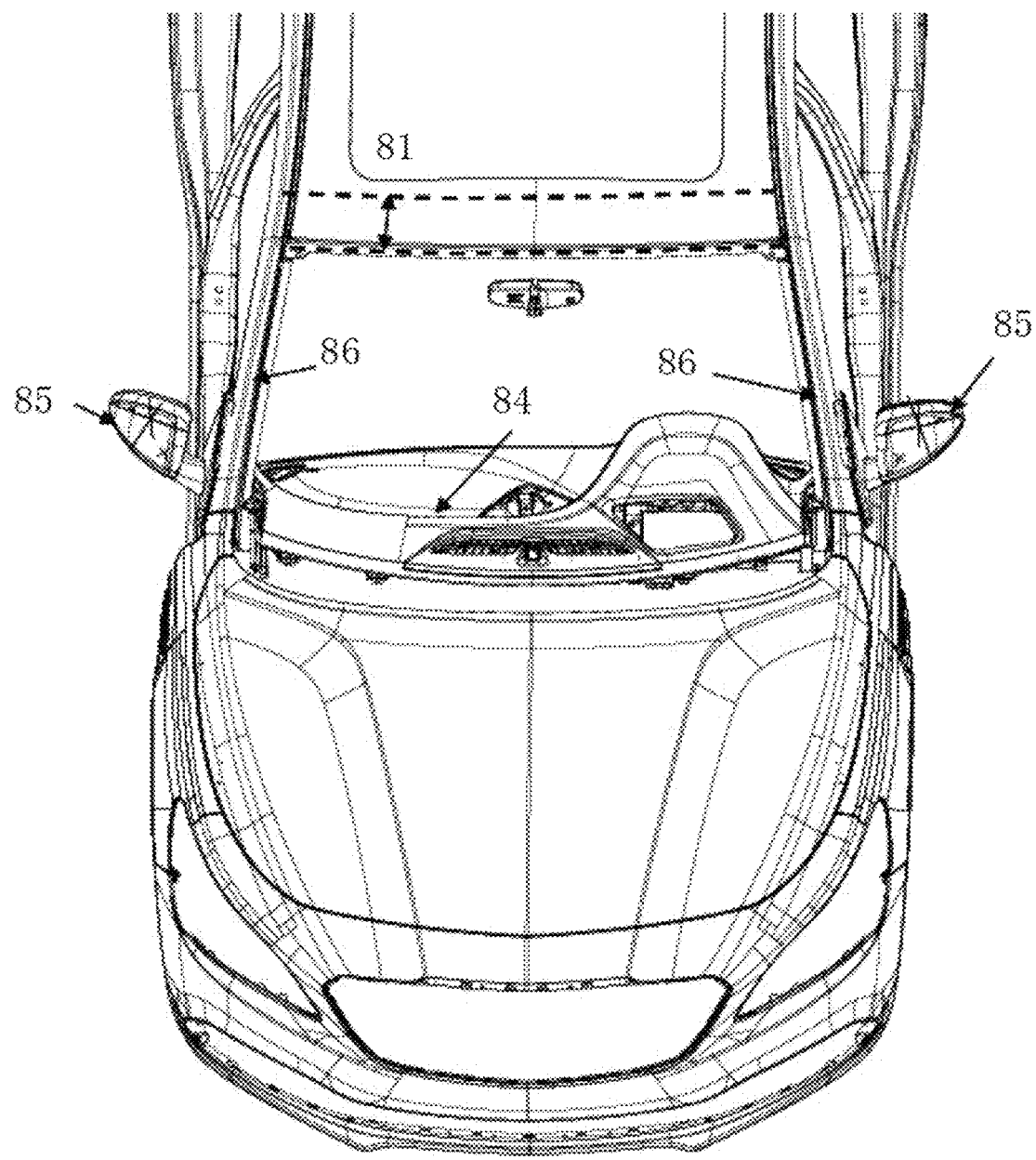
FIG. 9 shows a schematic view of the setting range of the camera device in accordance with another embodiment of the present invention.

As shown in FIGS. 8 and 9, the camera device can be installed on the peripheral area of the front windshield of the vehicle. Preferably the camera device is installed on a front region 81 of top of the vehicle, an inner rearview mirror area 82, an edge region 83 of front windshield, a dashboard 84, an outer rearview mirror 85, or an A column 86 of the vehicle. Wherein the front region 81 of top of the vehicle is preferably an outer region of the vehicle extending 600 mm from the edge of the windshield to the top of the vehicle, the inner rearview mirror area 82 is preferably an area surrounded by an inner rear view mirror and a peripheral 300 mm, and the edge region 83 of front windshield is preferably an area surrounded by the peripheral 400 mm from the glass edge of the front windshield. A column is a connecting column used to connect the top of the vehicle and the front compartment in left front and right front. The camera device can also be a driving recorder. The driving recorder captures user gestures.

In one of the embodiments, an effective detection area of the infrared detection device is a region extending the preset distance from a vehicle outer contour of the vehicle head.

Figure 10:
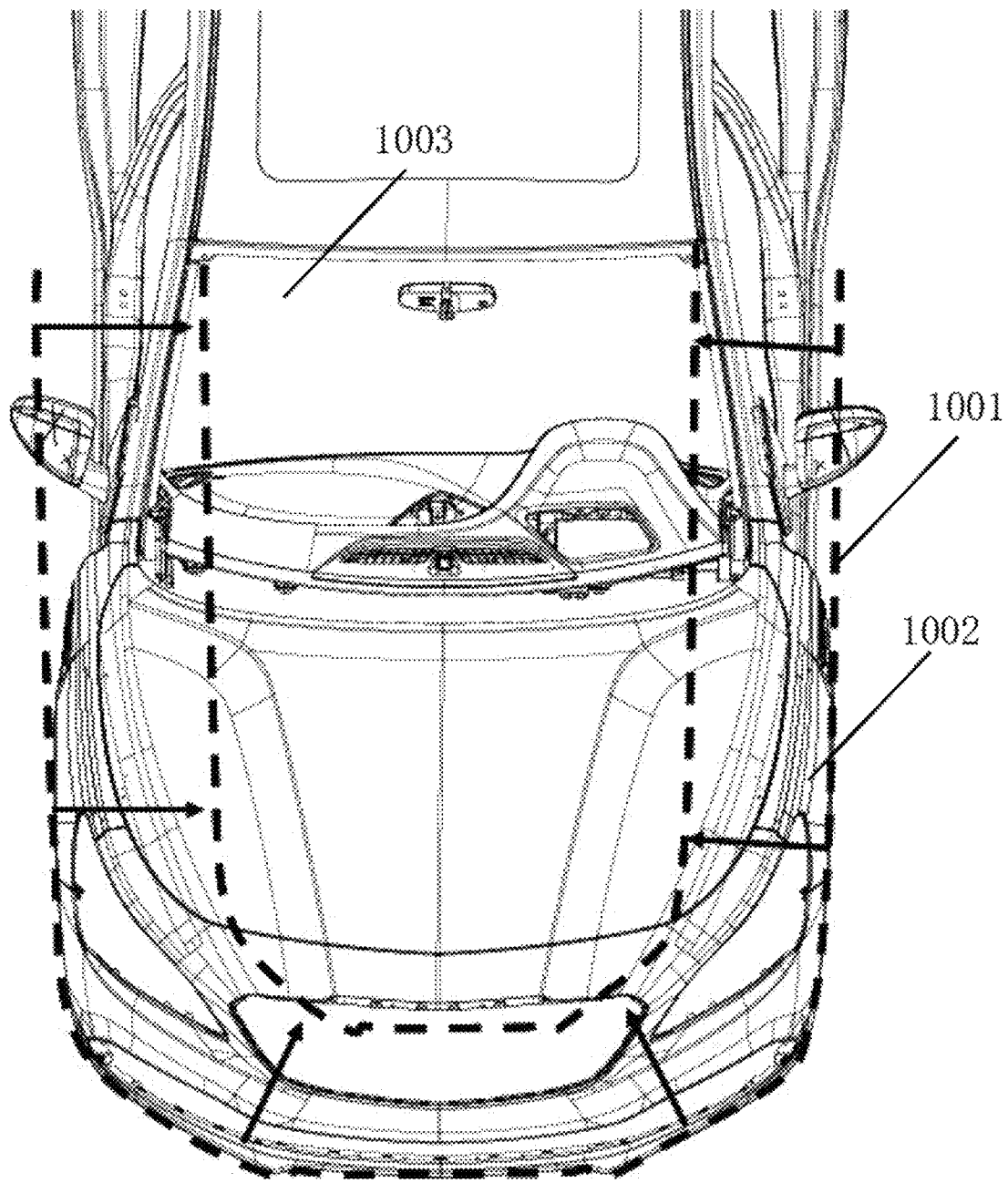
FIG. 10 shows a schematic view of the setting range of the infrared detection device in accordance with one embodiment of the present invention.

The infrared detection device may be provided at the front end of the vehicle. As shown in FIG. 10, the effective detection area of the infrared detection device is a region 1002 extending inwardly the preset distance from a vehicle outer contour 1001 of the vehicle head (as shown in the arrow direction in FIG. 10). Preferably, the effective detection area of the infrared detection device is an area of extending inwardly 600 mm from a vehicle outer contour 1001 of the vehicle head. And the effective detection area of the infrared detection device extends beyond the front windshield 1003. The most preferred position is on top of the engine cover lock of the engine cover.

In the present embodiment, the convenience of the customer can be improved by defining the effective detection area of the infrared detection device, and the arrangement of the infrared detection apparatus. The customer perception experience in the area is good. The infrared detection device can be set according to the effective detection area and the sensing distance of the infrared detection device. For example, when the sensor sensing distance is 300 mm, it can be arranged at a position farthest 900 mm from the outer contour.

In one of the embodiments, the action sensor is a contact action sensor for detecting a user's action on the engine cover, and the action signal is a contact action signal.

The contact action sensor is used for detecting the contact action of the user against the engine cover. When the user performs an action such as pressing on the engine cover, the contact action sensor converts the detected action into a corresponding action signal, and when the generated action signal is match with the preset unlock action signal, step S103 is triggered to unlock the engine cover.

In one of the embodiments, the contact action sensor is a pressing sensor or an angle sensor.

When the user operates the engine cover, the depression or the angle change occurring in the engine cover is detected by the pressing sensor and the angle sensor, and the judgment is made in step S102, and when the generated action signal is matched with the preset unlock action signal, step S103 is triggered to unlock the engine cover.

In one of the embodiments, the pressing sensor is provided within a range surrounded by a front bumper, a front headlamp and a front beam of the vehicle, on the front bumper, on the front headlamp, or on the front beam.

Figure 11:
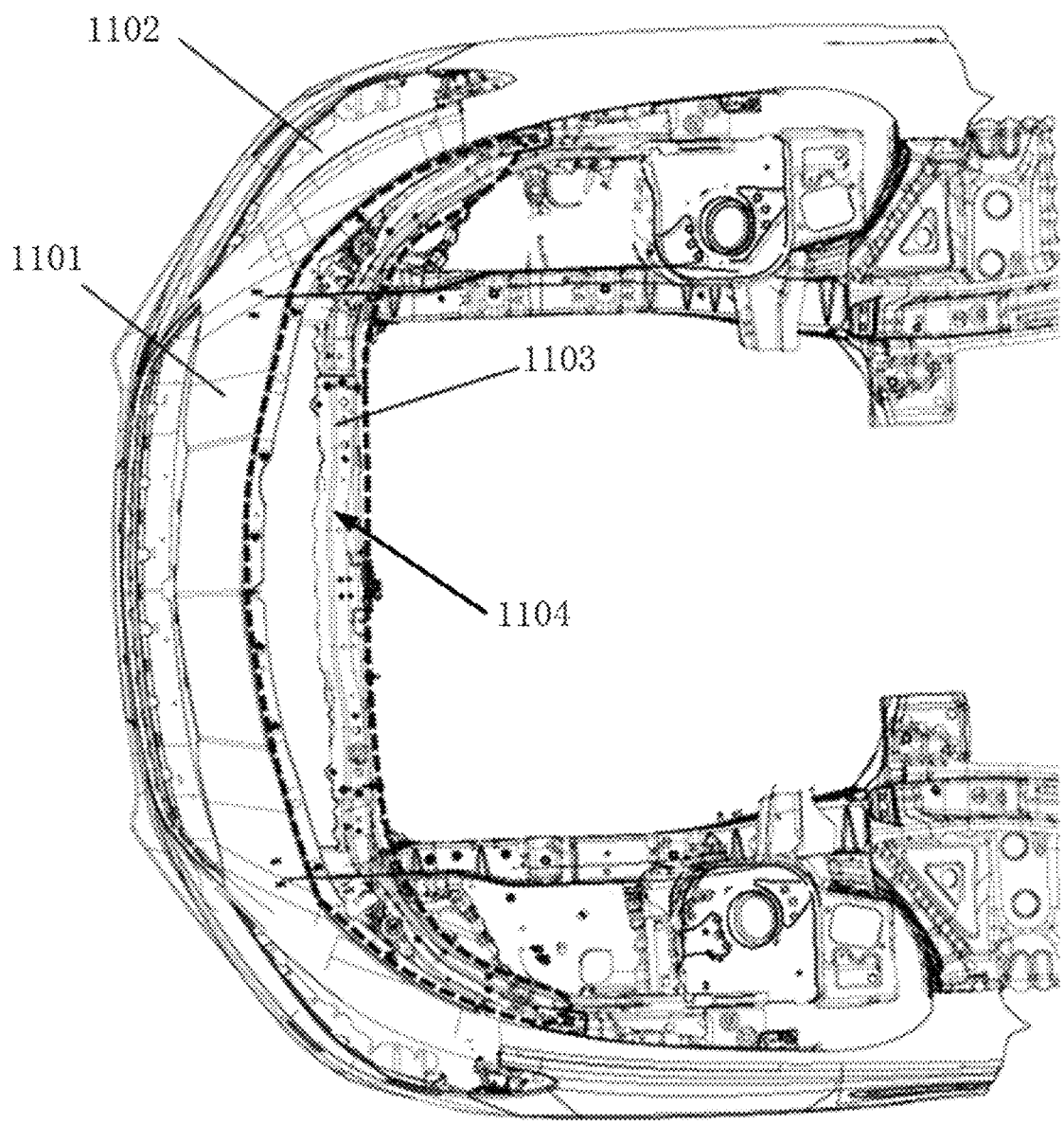
FIG. 11 shows a schematic view of the setting range of the pressing sensor in accordance with one embodiment of the present invention.

Wherein, as shown in FIG. 11, the pressing sensor can be provided on the front beam 1101, the front headlamp 1102, or within a range 1104 surrounded by a front bumper 1101, a headlamp 1102 and a vehicle beam 1103. The angle sensor can be provided on the rotation mechanism of the lock body.

Figure 12:
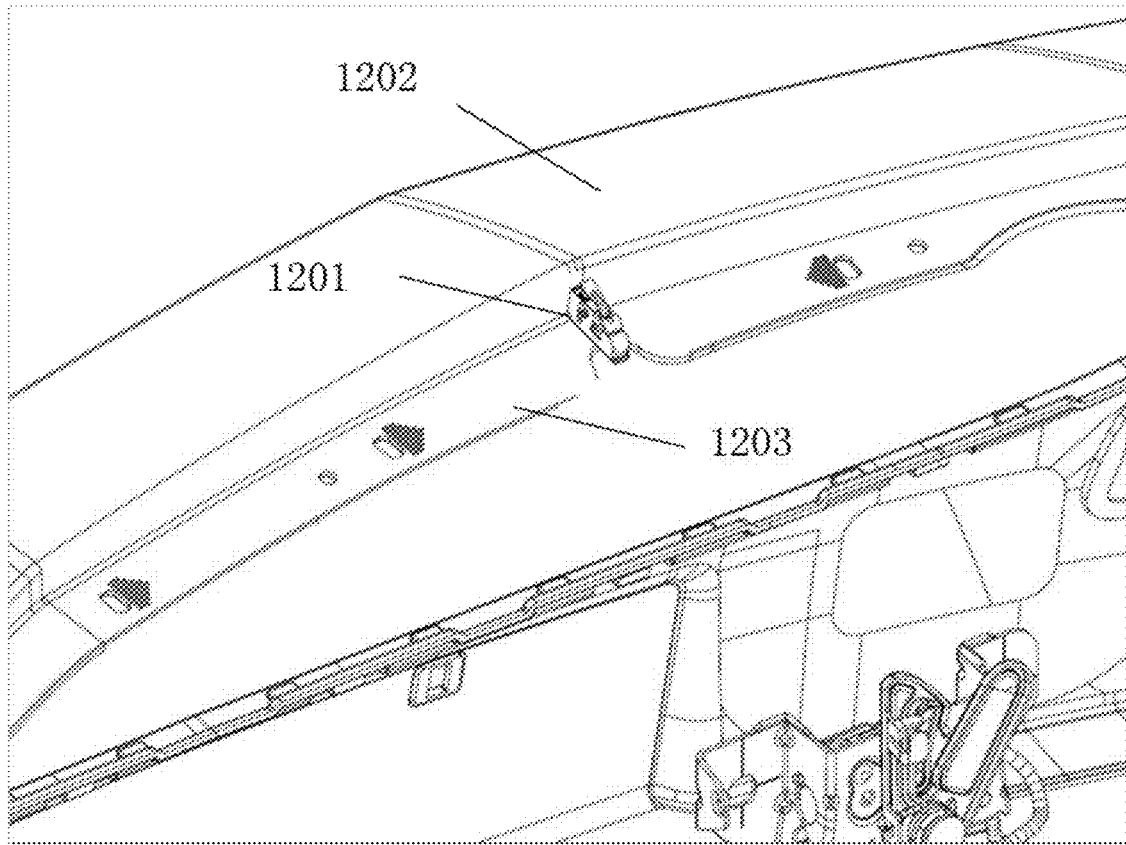
FIG. 12 shows a schematic view of an enlargement setting range of the pressing sensor shown in FIG. 11 in accordance with the present invention.
Figure 13:
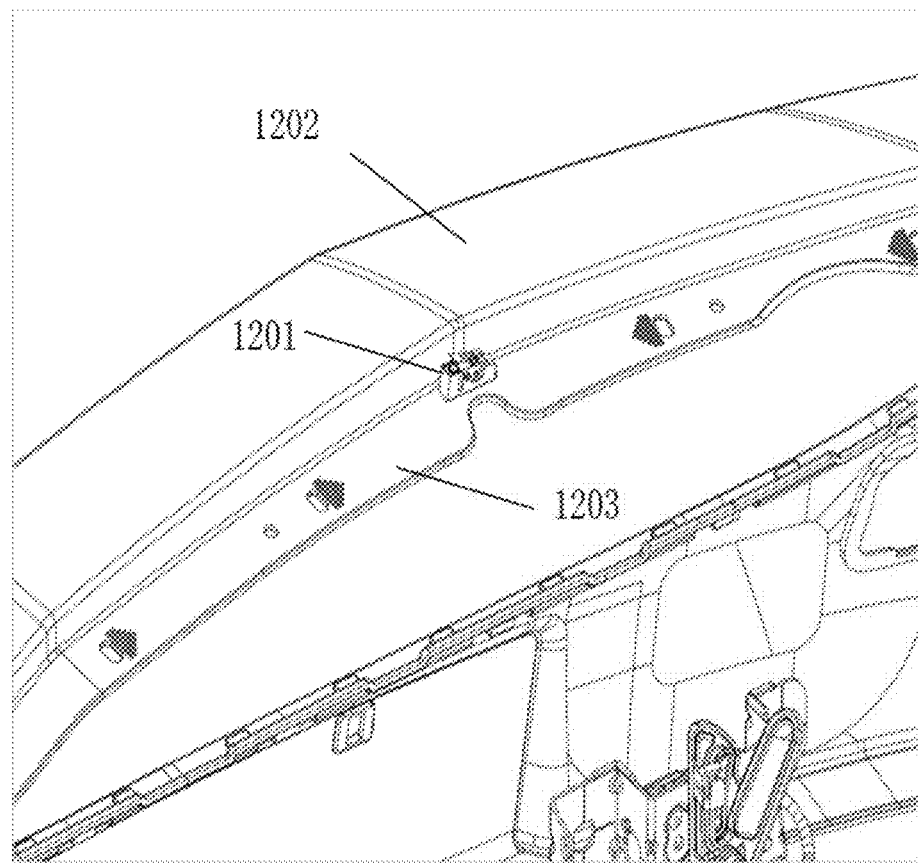
FIG. 13 shows another schematic view of an enlargement setting range of the pressing sensor shown in FIG. 11 in accordance with the present invention.
Figure 14:
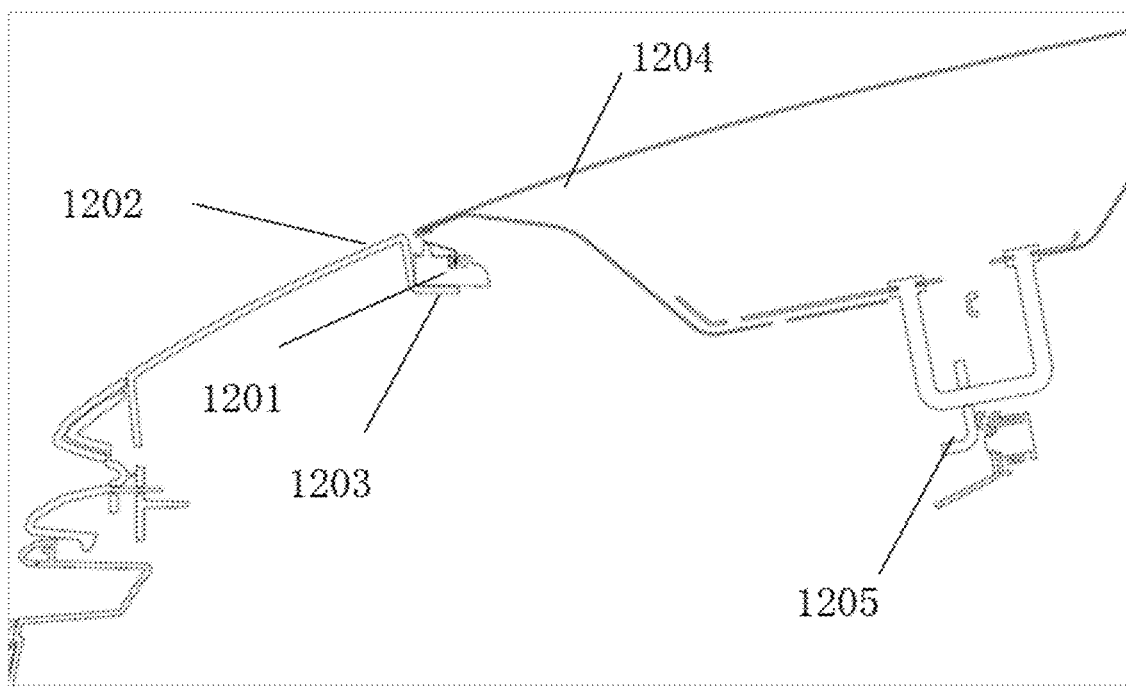
FIG. 14 shows a schematic view of the case where the engine cover is not pressed against the pressing sensor in accordance with one embodiment of the present invention.
Figure 15:
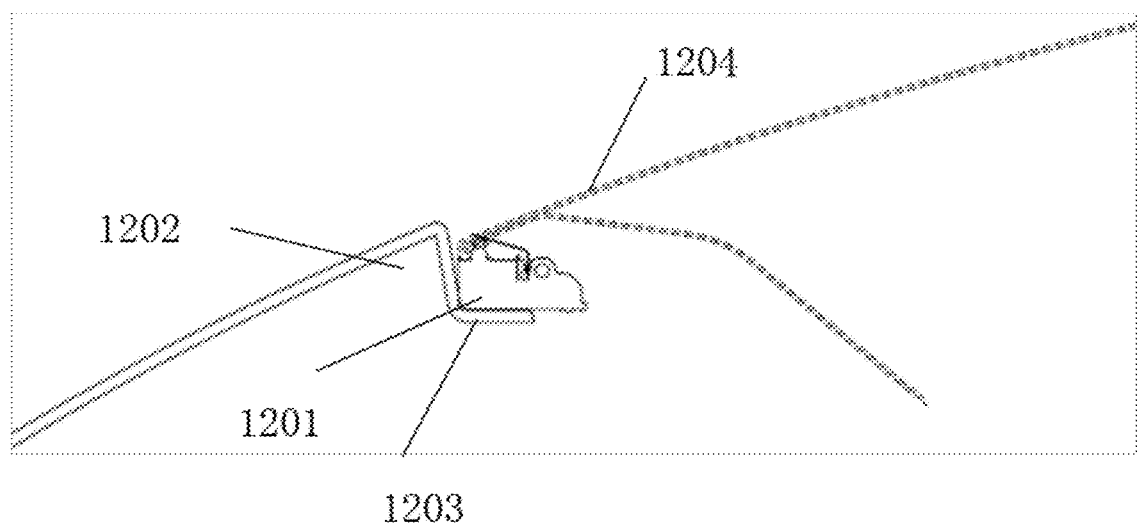
FIG. 15 shows a schematic view of the case where the engine cover is pressed against the pressing sensor in accordance with one embodiment of the present invention.

As shown in FIG. 12 and FIG. 13, as one of the embodiments, the pressing sensor 1201 is provided on the bearing surface 1203 of the front bumper 1202, wherein the bearing surface 1203 is used for carrying the engine cover. The pressing sensor 1201 can be a longitudinal arrangement as shown in FIG. 12, or may be a lateral arrangement as shown in FIG. 13, or any other directions. As shown in FIG. 14, when the engine cover 1204 is closed, it does not apply pressure to the pressing sensor 1201, and not trigger step S103 at this moment, the engine cover lock 1205 locks the engine cover. As shown in FIG. 15, when the user presses the engine cover 1204, the engine cover 1204 is forced downwardly to apply pressure to the pressing sensor 1201; thereby step S103 is triggered to unlock the engine cover.

Figure 2:
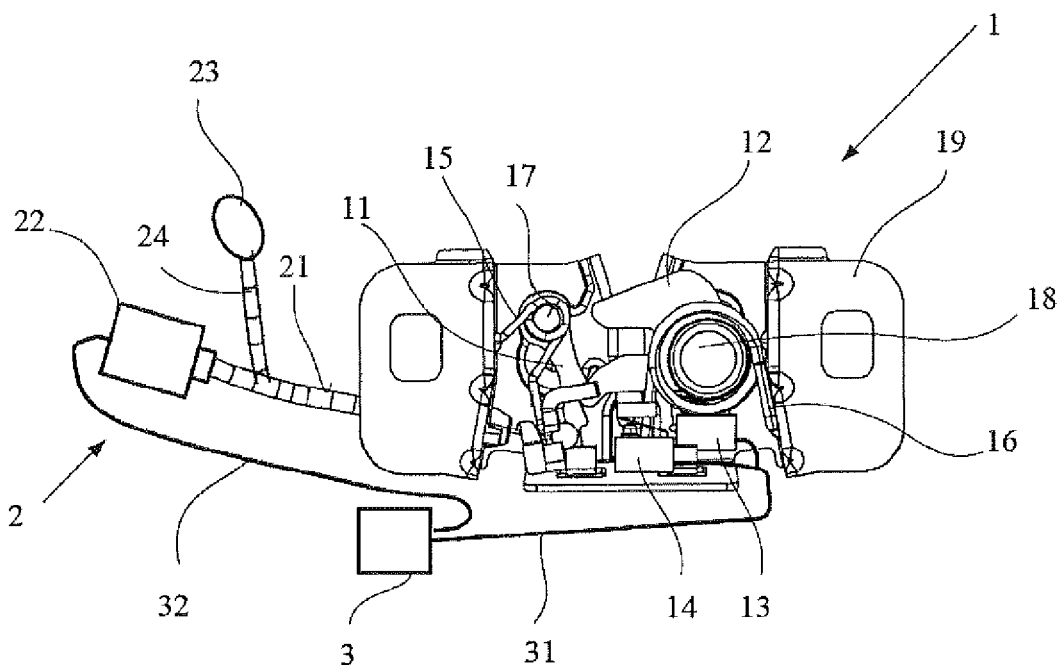
FIG. 2 shows the structure of the engine cover lock in accordance with the present invention.
Figure 3:
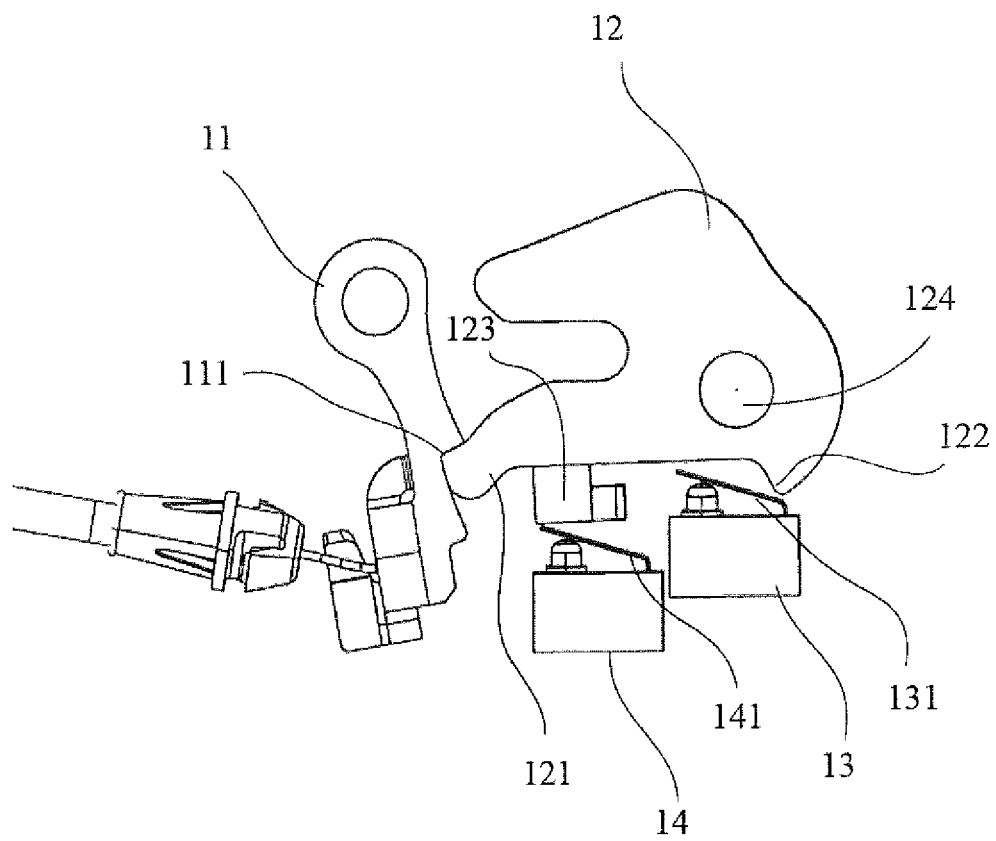
FIG. 3 shows an enlarged view of the rotation mechanism in the locked state in accordance with the preferred embodiment of the present invention.

In one of the embodiments, as shown in FIG. 2 and FIG. 3, the engine cover lock 1 includes a lock body 19, a release mechanism 11 and a rotation mechanism 12, the lock body 19 is in connection with the vehicle engine cover, the rotation mechanism 12 is rotatable around a rotation shaft 124 fixed to the lock body 19 to cooperate with the release mechanism 11 to form a locked state or an unlocked state, the rotation mechanism 12 rotates to the lock occurrence direction in locked state to trigger the contact action sensor 14 to transmit the action signal. Wherein the rotation mechanism 12 is rotated in the unlocking direction to switch from the locked state to the unlocked state when the engine cover lock 1 is executing an unlock operation on the vehicle engine cover in step S103; When the engine cover lock 1 is executing a lock operation on the vehicle engine cover, the rotation mechanism 12 is rotated in the lock occurrence direction to switch from the unlocked state to the locked state.

The present embodiment detects whether or not the vehicle engine cover is still pressed when the rotation mechanism 12 is in the locked state by the contact action sensor 14. Specifically, if the vehicle engine cover is executing a lock operation, the rotation mechanism rotates to the lock occurrence direction, when the unlock operation is executed by the vehicle engine cover, the rotation mechanism rotates to the unlock occurrence direction. In the present embodiment, the lock occurrence direction is counterclockwise and the corresponding unlock occurrence direction is clockwise. In addition, the lock occurrence direction can also be clockwise, then the corresponding unlock occurrence direction is counterclockwise, and the structure should also be adjusted accordingly. The rotation mechanism is switched to the locked state when the vehicle engine cover performs the lock operation, and if the rotation mechanism continues to rotate to the lock occurrence direction, it indicates that the vehicle engine cover is pressed by the external force, and therefore, when the rotation mechanism 12 rotates to the lock occurrence direction in the locked state, it is possible to judge that the engine cover is pressed by the external force, and the contact action sensor 14 outputs an action signal to trigger step S101. Wherein the rotation mechanism is in the locked state, that is, the rotation mechanism is locked by the release mechanism so as to block the rotation mechanism rotating to the unlock occurrence direction, and the rotation mechanism is in the unlocked state, that is, the release mechanism unblocks the rotation mechanism rotating to the unlock occurrence direction.

The contact action sensor 14 monitors the rotation of the rotation mechanism 12. In one embodiment, the contact action sensor 14 can be an angle sensor disposed adjacent to the rotation axis of the rotation mechanism, the angle sensor detecting the rotation angle of the rotation mechanism 12, and when the rotation mechanism 12 is rotated beyond the preset trigger angle in the locked state, the angle sensor sends an action signal. In addition, it can be implemented in the following manner.

Figure 4:
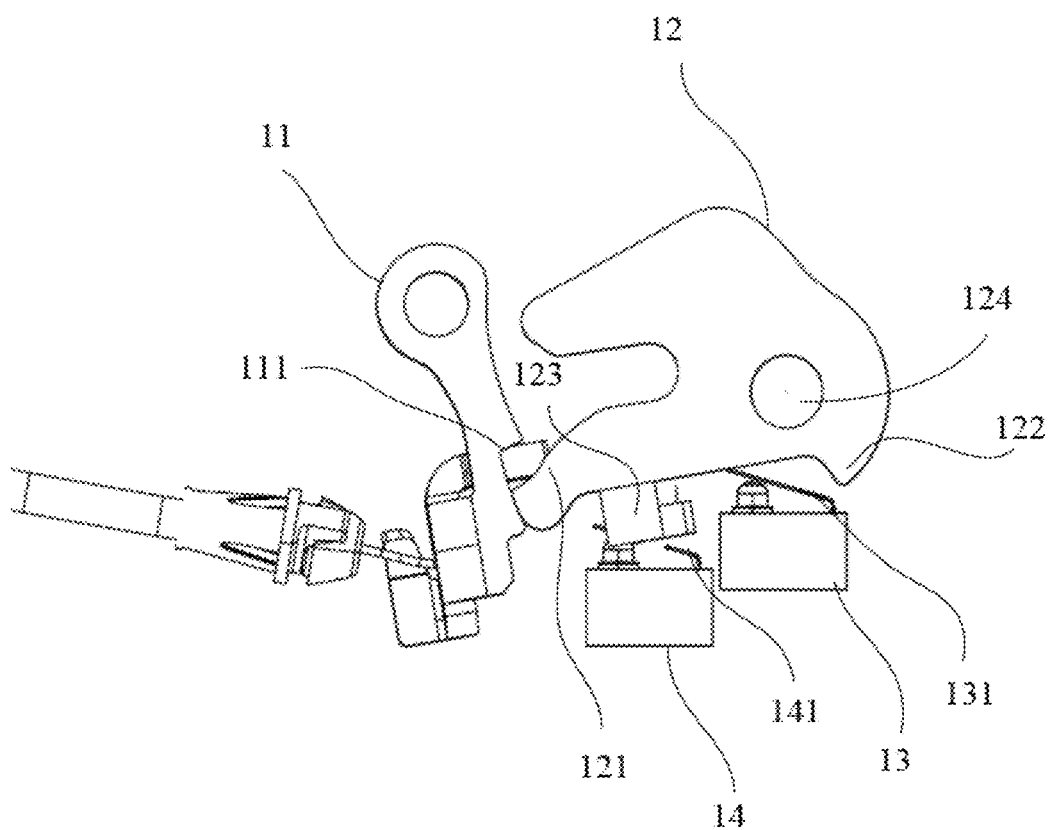
FIG. 4 shows an enlarged view of the rotation mechanism being pressed by a user in accordance with the preferred embodiment of the present invention.

In one of the embodiments, as FIG. 3 shows an enlarged view of the rotation mechanism in the locked state in accordance with the preferred embodiment of the present invention, as FIG. 4 shows an enlarged view of the rotation mechanism being pressed by a user in accordance with the preferred embodiment of the present invention. The rotation mechanism 12 includes a latch 121, the release mechanism 11 includes a notch 111 fitted to the latch 121, the latch 121 is engaged with the notch to form the locked state or the unlocked state when the rotation mechanism is rotating, the latch 121 is provided with a first projection 123, the contact action sensor 14 is a first pressing sensor, when the rotation mechanism 12 rotates to the lock occurrence direction in locked state to cause the first projection presses the first pressing sensor, the first pressing sensor is triggered to output the action signal.

Preferably, the first projection 123 is disposed below the latch 121, and the first pressing sensor is disposed below the first projection 123.

As shown in FIG. 3, when the rotation mechanism is in the locked state, the first projection 123 does not press the contact action sensor 14. As shown in FIG. 4, when the rotation mechanism is pressed by the user, the first projection 123 presses the contact action sensor 14, thereby triggering the first pressing sensor to output the action signal.

In relative to the electronic detection method which is liable to cause malfunction due to external environmental factors such as humidity, the present embodiment is more reliable by using the mechanical pressing method to realize the detection which the rotation mechanism 12 is rotated to the locked occurrence direction in locked state. Wherein the latch and the notch are in the locked state in such a manner that the latch is clamped by the notch so as to block the rotation mechanism rotating to the unlock occurrence direction, and the latch and the notch are in the unlocked state in such a manner that the latch is separated from the notch so as to unblock the rotation mechanism rotating to the unlock occurrence direction.

In one of the embodiments, the step S101 specifically includes:

reading a gear position information and an output signal of the locked state sensor for monitoring the switching state of the vehicle engine cover in response to a received vehicle unlock signal, executing the step S102 if the gear position information is parked gear position and the output signal of the locked state sensor is a closed signal identifying the vehicle engine cover as a closed state, and not executing the step S102 if the gear position information is un-parked gear position or the output signal of the locked state sensor is a opened signal identifying the vehicle engine cover as a opened state.

In present embodiment, before the vehicle is unlocked, any of the presses against the engine cover will not have any action. After the vehicle is unlocked, the electronic control unit (ECU) outputs the vehicle unlock signal to wake up the present system to read the gear position information (to determine whether the vehicle is parked) and the engine cover lock status information. When both meet the conditions, and then read the action signal from the contact action sensor, then if the user is pressing the engine cover at the time, it generates the action signal, which is read by the system, and the following judgment and operation will be performed. In the present embodiment, the auto unlocking is executed only when the vehicle is unlocked, so that the user's property can be secured. Reading whether the vehicle is in the parked gear position firstly can ensure the user driving safely, and avoid false trigger operations. Moreover, the system is relatively simple, more energy efficient. Meanwhile, since the customer normally needs to unlock the engine cover after the vehicle is unlocked, the unlocking mode of the present embodiment is also in accordance with the normal use of the customer.

Preferably, when the vehicle is locked, the electronic control unit (ECU) outputs a vehicle lock signal, at that time reading the action signal of the contact action sensor is stopped, or when the gear position is changed so that the gear position information is no longer the parked gear position, or when the output signal of the locked state sensor is an open signal indicating that the vehicle engine cover is in the open state, reading the action signal of the contact action sensor is stopped.

In one of the embodiments, as shown in FIG. 2 and FIG. 3, the engine cover lock 1 includes a lock body 19, a release mechanism 11 and a rotation mechanism 12, the lock body 19 is in connection with the vehicle engine cover, the rotation mechanism 12 is rotatable around a rotation shaft 124 fixed to the lock body 19 to cooperate with the release mechanism 11 to form a locked state or an unlocked state, wherein, when the step S103 is executed, the engine cover lock 1 performs an unlock operation on the vehicle engine cover so that the rotation mechanism 12 rotates to the unlock occurrence direction to switch from the locked state to the unlocked state, and the engine cover lock 1 performs a lock action on the vehicle engine cover so that the rotation mechanism 12 rotates to the lock occurrence direction to switch from the unlocked state to the locked state. The lock state sensor 13 is triggered to output the closed signal identifying the vehicle engine cover as the closed state when the rotation mechanism 12 is in locked state, the lock state sensor 13 is triggered to output the opened signal identifying the vehicle engine cover as the opened state when the rotation mechanism 12 is in unlocked state.

The present embodiment detects whether the rotation mechanism 12 is in the locked state or in the unlocked state by the lock state sensor 13, and the locked state or the unlocked state of the rotation mechanism 12 corresponds to the opened/closed state of the vehicle engine cover. Therefore, the opened or closed status of the vehicle engine cover is determined by detecting that the rotation mechanism 12 is in locked state or unlocked state. Wherein the closed signal and the opened signal are the specific signals of the output signals from the lock state sensor. Wherein the rotation mechanism is in the locked state in such a manner that the rotation mechanism is locked by the release mechanism so as to block the rotation mechanism rotating to the unlock occurrence direction, and the rotation mechanism is in the unlocked state in such a manner that the release mechanism unblock the rotation mechanism rotating to the unlock occurrence direction.

The lock state sensor 13 monitors the rotation of the rotation mechanism 12, and in one embodiment of the present application, the lock state sensor 13 can be a lock state angle sensor provided beside the rotation shaft of the rotation mechanism, the lock state angle sensor detects the rotation angle of the rotation mechanism 12. When the rotation mechanism 12 rotates beyond the preset lock angle to the lock occurrence direction, the lock state angle sensor outputs the closed signal identifying the vehicle engine cover as the closed state. When the rotation mechanism 12 rotates beyond the preset unlock angle to the unlock occurrence direction, the lock state angle sensor outputs the opened signal identifying the vehicle engine cover as the opened state. In addition, it can be implemented in the following manner.

Figure 5:
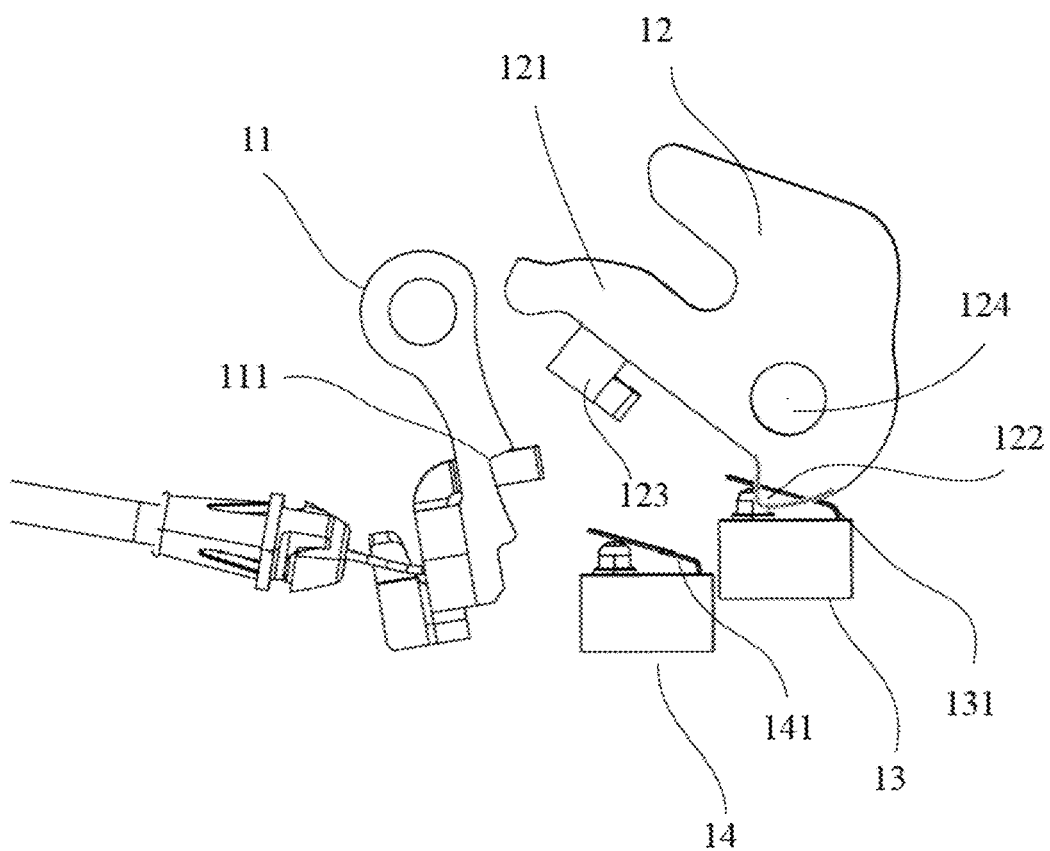
FIG. 5 shows an enlarged view of the rotation mechanism in the unlocked state in accordance with the preferred embodiment of the present invention.

In one of the embodiments, FIG. 3 shows an enlarged view of the rotation mechanism in the locked state in accordance with the preferred embodiment of the present invention. FIG. 5 shows an enlarged view of the rotation mechanism in the unlocked state in accordance with the preferred embodiment of the present invention. The rotation mechanism 12 includes a latch 121, the release mechanism 11 includes a notch 111 fitted to the latch 121, the latch 121 is engaged with the notch 111 to form the locked state or the unlocked state when the rotation mechanism 12 is rotating, the latch 121 is provided with a second projection 122, the lock state sensor 13 is a second pressing sensor, the second projection 122 is continuously pressing the second pressing sensor when the rotation mechanism is in the locked state so that the second pressing sensor outputs the closed signal identifying the vehicle engine cover as the closed state, the second projection 122 is separated from the second pressing sensor when the rotation mechanism is in the unlocked state so that the second pressing sensor outputs the opened signal identifying the vehicle engine cover as the opened state.

Preferably, the second projection 122 is disposed below the latch 121 and the second pressing sensor is disposed below the second projection 122.

Wherein the latch and the notch form the locked state, that is, the latch is locked by the notch so as to block the rotation mechanism rotating to the unlock occurrence direction, and the latch and the notch form the unlocked state, that is, the latch is separated from the notch so that the rotation mechanism rotates to the unlock occurrence direction.

As shown in FIG. 3, when the rotation mechanism 12 is in the locked state, the second projection 122 is continuously pressing the second pressing sensor so that the second pressing sensor outputs the closed signal identifying the vehicle engine cover as the closed state. As shown in FIG. 5, when the rotation mechanism 12 is in the unlocked state, the second projection 122 is separated from the second pressing sensor so that the second pressing sensor outputs the opened signal identifying the vehicle engine cover as the opened state. The closed signal can be high level voltage, and correspondingly the opened signal is low level voltage. The closed signal can also be low level voltage, and correspondingly the opened signal is high level voltage.

In one of the embodiments, the unlock action signal is a combination of a signal or a plurality of consecutive signals.

The unlocking operation signal can be a signal preset by the user, and the step S103 is executed when the received action signal matches the preset unlock action signal. For example, if the action sensor is a gesture action sensor, step S103 is executed when the gesture (e.g., waving left or right) indicated by the action signal output by the gesture action sensor is the same as the preset gesture signal.

The unlock action signal may be a combination of a plurality of successive signals preset by the user, and the step S103 is executed when the received plurality of consecutive action signals matches the preset unlocking operation signals. For example, the preset unlock action signal continuously reads two action signals in a preset time, that is, when the action signal is detected, the step S103 is executed if the time between the previous action signal is detected within the preset time. When the contact action sensor is the pressure sensor, the action signal is the pressing signal, the unlock action signal can further be two pressing signals continuously read in a preset time.

The use of a combination of a plurality of successive signals can avoid the situation that a single signal is easy to cause false trigger. For example, the user needs to press twice successive to trigger the unlocking, which can avoid the accidentally press situation from the user.

As a preferred embodiment of the present invention, the mechanical structure is composed of an engine cover lock 1, an actuator mechanism 2, and a processor 3.

The engine cover lock 1 provides the processor 3 with functions of reading lock signal, unlock signal and related signal. The engine cover lock 1 includes a release mechanism 11, a rotation mechanism 12, a lock state sensor 13, a contact action sensor 14, a release mechanism spring 15, a rotating mechanism spring 16, a release mechanism rivet 17, a rotation mechanism rivet 18, and a lock body 19. The rotation mechanism 12 is used to lock or unlock the vehicle engine cover. When the rotation mechanism 12 rotates the U-shaped port of the latch 121 to the state shown in FIG. 3, the vehicle engine cover is locked, and when the U-shaped port of the latch 121 rotates to a certain angle in clockwise direction, the vehicle engine cover is unlocked. The release mechanism 11 is used to control the unlocking action of the rotation mechanism 12. The lock state sensor 13 is used to read the locked state or the unlocked state of the rotation mechanism 12 so as to obtain the locked and unlocked state of the engine cover lock 1, that is, the locked and unlocked of the vehicle engine cover. The contact action sensor 14 determines the opening intention of the customer by reading the customer's action information. The release mechanism spring 15 and the rotation mechanism spring 16 are both for the return of the release mechanism 11/the rotation mechanism 12. The release mechanism rivet 17 is used for mounting the release mechanism 11 and the release mechanism spring 15 on the lock body 19, and the rotation mechanism rivet 18 is used to mount the rotation mechanism 12 and the rotation mechanism spring 16 on the lock body 19. The lock body 19 provides a mounting body for each part of the lock.

The actuator mechanism 2 receives information from the processor 3 to provide a related operation to the cover lock 1. The actuator mechanism 2 includes a cable 21, and an actuator 22. The cable 21 is directly connected to the release mechanism 11 of the cover lock 1 by various connection ways such as ball connection, cylinder connection, etc. The actuator 22 controls the action of the cable 21, and the connection between the two can use various ways such as ball connection, cylinder connection, etc.

Preferably, the system has a mechanical opening method, designing a mechanical handle 23 for spare. The mechanical handle 23 can be selected according to the project requirements.

Preferably, the mechanical handle 23 and the release mechanism 11 are connected by a branch 24 on the cable 21, or can be designed in the form of an independent cable according to the actual situation.

The processor 3 reads various signals from the lock state sensor 13 and the contact action sensor 14 or the camera device or the infrared detection device, analyses the unlocking intention of the user by the unlocking method of the present invention, and sends the operation instruction to the actuator 22.

As shown in FIG. 5, when the rotation mechanism 12 is in the unlocked state, the second projection 122 on the rotation mechanism is pressing against the reed 131 of the lock state sensor 13 to generate an unlock signal. As shown in FIG. 3, when the rotation mechanism 12 is in the locked state, the lock state sensor 13 is in a free state. So that the system can determine the opened/closed state of the vehicle engine cover system according to the state of the lock state sensor 13.

As shown in FIG. 4, when the rotation mechanism 12 is in the locked state and the user is pressing the vehicle engine cover, the rotation mechanism 12 is rotated downward by pressing, and the first projection 123 is pressing against the reed 141 of the contact action sensor 14 to generate a pressing action signal. When the pressing is completed, the rotation mechanism 12 is returned to the locked state by the rotation mechanism spring 16. Each time the user presses, a pressing action signal is generated.

Figure 6:
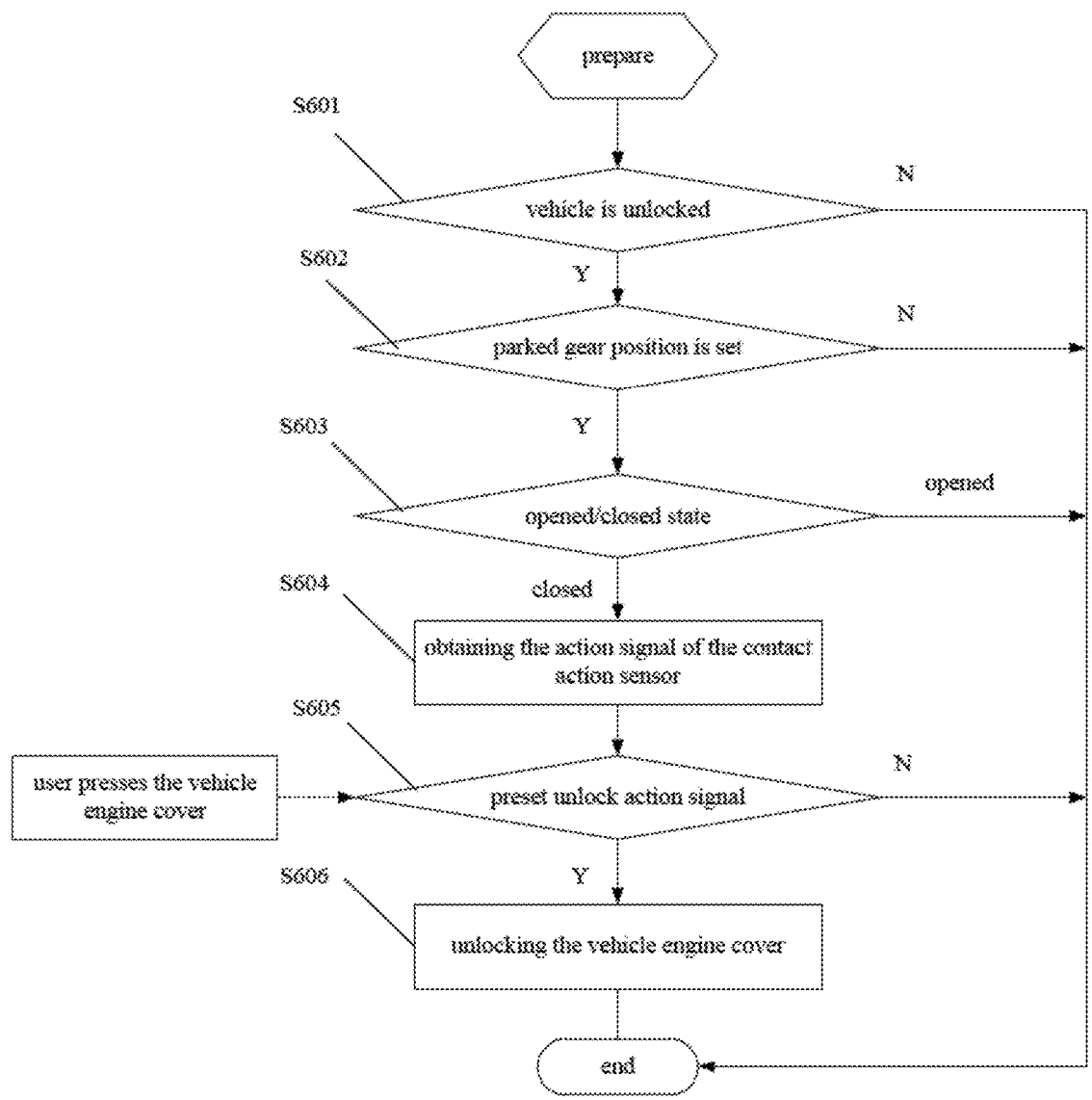
FIG. 6 shows a flow-process diagram in accordance with the preferred embodiment of the present invention.

FIG. 6 shows a flow-process diagram in accordance with the preferred embodiment of the present invention, comprising:

Step S601, if the vehicle is unlocked, step S602 is executed, otherwise it ends;

Step S602, judging whether it is the parked gear position, step S603 is executed if yes, otherwise it ends;

Step S603, judging the opened/closed state of the vehicle engine cover, step S604 is executed if it is in the closed state, otherwise it ends;

Step S604, obtaining the action signal of the contact action sensor, when the user presses the vehicle engine cover, the action signal is pressing signal;

Step S605, judging whether the action signal is the preset unlock action signal, step S606 is executed if yes, otherwise it ends;

Step S606, unlocking the vehicle engine cover.

Specifically, the user unlock action signal is preset in the processor 3 and stored for user action identification. The present embodiment uses the time judgment for the pressing action, that is, it is regarded as the unlock action signal if the pressing action signal is read twice successively in 0.2 seconds to 2 seconds, it is not regarded as the unlock action signal if the pressing signal is read once the interval of reading the two pressing action signal is too short, or the interval of reading the two pressing action signal is too long. Therefore, users obtain sufficient convenience, while a variety of false trigger action are avoided.

Wherein, the unlock action signal can be set by the user, such as how many pressing, etc.

It is to be noted that the above parameters are for illustrative purposes only and are not to be construed as limiting the scope of the invention as claimed.

At the same time, the present embodiment reads the unlock signal of the vehicle and the state of the parked, and the unlocking method can be realized only when the user unlocks the vehicle and the vehicle is in the parked state to ensure the use safety of the user.

When the vehicle is unlocked and the vehicle is in the parked state, the user presses the vehicle engine cover system. At this time, the vehicle engine cover is in the closed state and the vehicle is unlocked and the vehicle is in the parked state, so the output signal of the lock state sensor 13 is closed signal. When the user presses the vehicle engine cover, the rotation mechanism 12 is rotated by the user's pressing action, and the second projection 122 presses the reed 141 of the contact action sensor 14 to generate an action signal. The contact action sensor 14 generates two pressing operation signals when the user performs the pressing operation twice successively, and after the processor 3 reads the action signal, the two action signals are conducted time analysis, and if the action signals are matched the 0.2 seconds to 2 seconds condition, the system determines that the pressing action combination is user unlock action signal, and the processor 3 outputs an unlock command to the actuator 22. The actuator 22 receives the unlock command, then pulls the cable 21 to pull the release mechanism 11 to the release state, and the rotation mechanism 12 is unlocked by the action of the spring 16.

When the vehicle is in a non-unlocked state or is not in a parked state, the system does not read the signals of the contact action sensor 14, thereby avoiding various safety problems.

When the vehicle engine cover is in the unlocked state, the system does not read the signal of the contact action sensor 14 because the vehicle engine cover is already in the unlocked state and there is no need for further unlocking.

Figure 7:
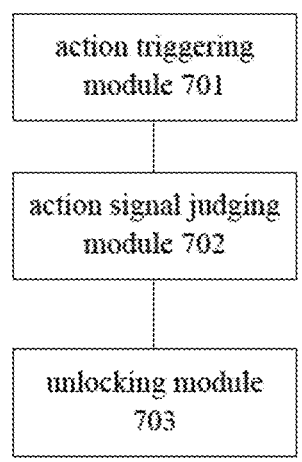
FIG. 7 shows a structural module drawing of system for unlocking vehicle engine cover in accordance with the present invention.

FIG. 7 shows a structural module drawing of system for unlocking vehicle engine cover in accordance with the present invention, comprising:

action triggering module 701, used for acquiring an action signal transmitted from an action sensor, and executing an action signal judging module;

action signal judging module 702, used for executing an unlocking module if the received action signal matches a preset unlock action signal, and not executing the unlocking module 703 if the received action signal does not match the preset unlock action signal 703;

unlocking module 703, used for sending an unlock signal to an engine cover lock, wherein the unlock signal is used to control the engine cover lock to perform an unlock operation on a vehicle engine cover.

In one of the embodiments, the action sensor is a gesture action sensor for detecting a user gesture, and the action signal is a gesture action signal.

In one of the embodiments, the gesture action sensor is a camera device or an infrared detection device.

In one of the embodiments, the camera device is provided on a front region of top of the vehicle, an inner rearview mirror area, an edge region of front windshield, a dashboard, an outer rearview mirror, or an A column of the vehicle, and the shooting direction of the camera device is towards the direction of the front of the vehicle In one of the embodiments, an effective detection area of the infrared detection device is a region extending the preset distance from a vehicle outer contour of the vehicle head.

In one of the embodiments, wherein the action sensor is a contact action sensor for detecting a user's action on the engine cover, and the action signal is a contact action signal.

In one of the embodiments, the contact action sensor is a pressing sensor or an angle sensor.

In one of the embodiments, the pressing sensor is provided within a range surrounded by a front bumper, a front headlamp and a front beam of the vehicle, on the front bumper, on the front headlamp, or on the front beam.

In one of the embodiments, the engine cover lock includes a lock body, a release mechanism and a rotation mechanism, the lock body is in connection with the vehicle engine cover, the rotation mechanism is rotatable around a rotation shaft fixed to the lock body to cooperate with the release mechanism to form a locked state or an unlocked state, the rotation mechanism rotates to the lock occurrence direction in locked state to trigger the contact action sensor to transmit the action signal.

In one of the embodiments, the rotation mechanism includes a latch, the release mechanism includes a notch fitted to the latch, the latch is engaged with the notch to form the locked state or the unlocked state when the rotation mechanism is rotating, the latch is provided with a first projection, the contact action sensor is a first pressing sensor, when the rotation mechanism rotates to the lock occurrence direction in locked state to cause the first projection presses the first pressing sensor, the first pressing sensor is triggered to output the action signal.

In one of the embodiments, the action triggering module specifically includes:

reading a gear position information and an output signal of the locked state sensor for monitoring the switching state of the vehicle engine cover in response to a received vehicle unlock signal, executing the unlocking module if the gear position information is parked gear position and the output signal of the locked state sensor is a closed signal identifying the vehicle engine cover as a closed state, and not executing the unlocking module if the gear position information is un-parked gear position or the output signal of the locked state sensor is a opened signal identifying the vehicle engine cover as a opened state.

In one of the embodiments, the engine cover lock includes a lock body, a release mechanism and a rotation mechanism, the lock body is in connection with the vehicle engine cover, the rotation mechanism is rotatable around a rotation shaft fixed to the lock body to cooperate with the release mechanism to form a locked state or an unlocked state, the locked state sensor is triggered to output the closed signal identifying the vehicle engine cover as the closed state when the rotation mechanism is in locked state, the locked state sensor is triggered to output the opened signal identifying the vehicle engine cover as the opened state when the rotation mechanism is in unlocked state.

In one of the embodiments, the rotation mechanism includes a latch, the release mechanism includes a notch fitted to the latch, the latch is engaged with the notch to form the locked state or the unlocked state when the rotation mechanism is rotating, the latch is provided with a second projection, the lock state sensor is a second pressing sensor, the second projection is continuously pressing the second pressing sensor when the rotation mechanism is in the locked state so that the second pressing sensor outputs the closed signal identifying the vehicle engine cover as the closed state, the second projection is separated from the second pressing sensor when the rotation mechanism is in the unlocked state so that the second pressing sensor outputs the opened signal identifying the vehicle engine cover as the opened state.

In one of the embodiments, the unlock action signal is a combination of a signal or a plurality of consecutive signals.

The above-identified embodiments are only used for representing several examples of the present invention, which are illustrated in detail, but shall not be understood to limit the protection scope of the present patent. It should be noted that, several modifications and/or improvements may be made for the skilled in the art, without going beyond the technical concept of the present invention, all of which fall into the protection scope of the present invention. Therefore, the protection scope of the present invention is dependent on the accompanied claims.

The invention claimed is:

1. A method for unlocking a vehicle engine cover, comprising:
    action triggering step: acquiring an action signal transmitted from an action sensor, and executing an action signal judging step;
    action signal judging step: executing an unlocking step if the received action signal matches a preset unlock action signal, and not executing the unlocking step if the received action signal does not match the preset unlock action signal;
    unlocking step: sending an unlock signal to an engine cover lock, wherein the unlock signal is used to control the engine cover lock to perform an unlock operation on a vehicle engine cover;
    wherein the action triggering step specifically includes:
    reading a gear position information and an output signal of a locked state sensor for monitoring the switching state of the vehicle engine cover in response to a received vehicle unlock signal, executing the unlocking step if the gear position information is parked gear position and the output signal of the locked state sensor is a closed signal identifying the vehicle engine cover as a closed state, and not executing the unlocking step if the gear position information is un-parked gear position or the output signal of the locked state sensor is a opened signal identifying the vehicle engine cover as a opened state.

2. The method for unlocking vehicle engine cover according to claim 1, wherein the action sensor is a gesture action sensor for detecting a user gesture, and the action signal is a gesture action signal, the gesture action sensor is a camera device or an infrared detection device.

3. The method for unlocking vehicle engine cover according to claim 2, wherein the camera device is provided on a front region of top of the vehicle, an inner rearview mirror area, an edge region of front windshield, a dashboard, an outer rearview mirror, or an A column of the vehicle, and the shooting direction of the camera device is towards the direction of the front of the vehicle, an effective detection area of the infrared detection device is a region extending the preset distance from a vehicle outer contour of the vehicle head.

4. The method for unlocking vehicle engine cover according to claim 1, wherein the action sensor is a contact action sensor for detecting a user's action on the engine cover, and the action signal is a contact action signal, the contact action sensor is a pressing sensor or an angle sensor.

5. The method for unlocking vehicle engine cover according to claim 4, wherein the pressing sensor is provided within a range surrounded by a front bumper, a front headlamp and a front beam of the vehicle, on the front bumper, on the front headlamp, or on the front beam.

6. The method for unlocking vehicle engine cover according to claim 4, wherein the engine cover lock includes a lock body, a release mechanism and a rotation mechanism, the lock body is in connection with the vehicle engine cover, the rotation mechanism is rotatable around a rotation shaft fixed to the lock body to cooperate with the release mechanism to form a locked state or an unlocked state, the rotation mechanism rotates to the lock occurrence direction in locked state to trigger the contact action sensor to transmit the action signal.

7. The method for unlocking vehicle engine cover according to claim 6, wherein the rotation mechanism includes a latch, the release mechanism includes a notch fitted to the latch, the latch is engaged with the notch to form the locked state or the unlocked state when the rotation mechanism is rotating, the latch is provided with a first projection, the contact action sensor is a first pressing sensor, when the rotation mechanism rotates to the lock occurrence direction in locked state to cause the first projection presses the first pressing sensor, the first pressing sensor is triggered to output the action signal.

8. The method for unlocking vehicle engine cover according to claim 1, wherein the engine cover lock includes a lock body, a release mechanism and a rotation mechanism, the lock body is in connection with the vehicle engine cover, the rotation mechanism is rotatable around a rotation shaft fixed to the lock body to cooperate with the release mechanism to form a locked state or an unlocked state, the locked state sensor is triggered to output the closed signal identifying the vehicle engine cover as the closed state when the rotation mechanism is in locked state, the locked state sensor is triggered to output the opened signal identifying the vehicle engine cover as the opened state when the rotation mechanism is in unlocked state.

9. The method for unlocking vehicle engine cover according to claim 8, wherein the rotation mechanism includes a latch, the release mechanism includes a notch fitted to the latch, the latch is engaged with the notch to form the locked state or the unlocked state when the rotation mechanism is rotating, the latch is provided with a second projection, the lock state sensor is a second pressing sensor, the second projection is continuously pressing the second pressing sensor when the rotation mechanism is in the locked state so that the second pressing sensor outputs the closed signal identifying the vehicle engine cover as the closed state, the second projection is separated from the second pressing sensor when the rotation mechanism is in the unlocked state so that the second pressing sensor outputs the opened signal identifying the vehicle engine cover as the opened state.

10. A system for unlocking vehicle engine cover, comprising:
    action triggering module, used for acquiring an action signal transmitted from an action sensor, and executing an action signal judging module;
    action signal judging module, used for executing an unlocking module if the received action signal matches a preset unlock action signal, and not executing the unlocking module if the received action signal does not match the preset unlock action signal;
    unlocking module, used for sending an unlock signal to an engine cover lock, wherein the unlock signal is used to control the engine cover lock to perform an unlock operation on a vehicle engine cover,
    wherein the action triggering module specifically includes:
    reading a gear position information and an output signal of a locked state sensor for monitoring the switching state of the vehicle engine cover in response to a received vehicle unlock signal, executing the unlocking module if the gear position information is parked gear position and the output signal of the locked state sensor is a closed signal identifying the vehicle engine cover as a closed state, and not executing the unlocking module if the gear position information is un-parked gear position or the output signal of the locked state sensor is a opened signal identifying the vehicle engine cover as a opened state.

11. The system for unlocking vehicle engine cover according to claim 10, wherein the action sensor is a gesture action sensor for detecting a user gesture, and the action signal is a gesture action signal, the gesture action sensor is a camera device or an infrared detection device.

12. The system for unlocking vehicle engine cover according to claim 11, wherein the camera device is provided on a front region of top of the vehicle, an inner rearview mirror area, an edge region of front windshield, a dashboard, an outer rearview mirror, or an A column of the vehicle, and the shooting direction of the camera device is towards the direction of the front of the vehicle, an effective detection area of the infrared detection device is a region extending the preset distance from a vehicle outer contour of the vehicle head.

13. The system for unlocking vehicle engine cover according to claim 10, wherein the action sensor is a contact action sensor for detecting a user's action on the engine cover, and the action signal is a contact action signal, the contact action sensor is a pressing sensor or an angle sensor.

14. The system for unlocking vehicle engine cover according to claim 13, wherein the pressing sensor is provided within a range surrounded by a front bumper, a front headlamp and a front beam of the vehicle, on the front bumper, on the front headlamp, or on the front beam.

15. The system for unlocking vehicle engine cover according to claim 13, wherein the engine cover lock includes a lock body, a release mechanism and a rotation mechanism, the lock body is in connection with the vehicle engine cover, the rotation mechanism is rotatable around a rotation shaft fixed to the lock body to cooperate with the release mechanism to form a locked state or an unlocked state, the rotation mechanism rotates to the lock occurrence direction in locked state to trigger the contact action sensor to transmit the action signal.

16. The system for unlocking vehicle engine cover according to claim 15, wherein the rotation mechanism includes a latch, the release mechanism includes a notch fitted to the latch, the latch is engaged with the notch to form the locked state or the unlocked state when the rotation mechanism is rotating, the latch is provided with a first projection, the contact action sensor is a first pressing sensor, when the rotation mechanism rotates to the lock occurrence direction in locked state to cause the first projection presses the first pressing sensor, the first pressing sensor is triggered to output the action signal.

17. The system for unlocking vehicle engine cover according to claim 10, wherein the engine cover lock includes a lock body, a release mechanism and a rotation mechanism, the lock body is in connection with the vehicle engine cover, the rotation mechanism is rotatable around a rotation shaft fixed to the lock body to cooperate with the release mechanism to form a locked state or an unlocked state, the locked state sensor is triggered to output the closed signal identifying the vehicle engine cover as the closed state when the rotation mechanism is in locked state, the locked state sensor is triggered to output the opened signal identifying the vehicle engine cover as the opened state when the rotation mechanism is in unlocked state.

18. The system for unlocking vehicle engine cover according to claim 17, wherein the rotation mechanism includes a latch, the release mechanism includes a notch fitted to the latch, the latch is engaged with the notch to form the locked state or the unlocked state when the rotation mechanism is rotating, the latch is provided with a second projection, the lock state sensor is a second pressing sensor, the second projection is continuously pressing the second pressing sensor when the rotation mechanism is in the locked state so that the second pressing sensor outputs the closed signal identifying the vehicle engine cover as the closed state, the second projection is separated from the second pressing sensor when the rotation mechanism is in the unlocked state so that the second pressing sensor outputs the opened signal identifying the vehicle engine cover as the opened state.

* * * * *